United States Patent [19]
Grüning

[11] Patent Number: 5,731,967
[45] Date of Patent: Mar. 24, 1998

[54] CONVERTER CIRCUIT ARRANGEMENT WITH MINIMAL SNUBBER

[75] Inventor: Horst Grüning, Wettingen, Switzerland

[73] Assignee: Asea Brown Boveri AG, Baden, Switzerland

[21] Appl. No.: 670,646

[22] Filed: Jun. 26, 1996

[30] Foreign Application Priority Data

Jun. 26, 1995 [DE] Germany .................. 195 23 095.7

[51] Int. Cl.⁶ .................................................... H02H 7/122
[52] U.S. Cl. .................................................... 363/57; 363/135
[58] Field of Search .......................... 363/132, 136, 363/137, 138, 58, 57, 17, 135

[56] References Cited

U.S. PATENT DOCUMENTS

| | | | |
|---|---|---|---|
| 4,881,159 | 11/1989 | Holtz et al. | 363/58 |
| 5,448,467 | 9/1995 | Ferreira | 363/17 |

FOREIGN PATENT DOCUMENTS

| | | |
|---|---|---|
| 04 89 945 A1 | 6/1992 | European Pat. Off. . |
| 35 44 232 A1 | 6/1987 | Germany . |
| 38 01 327 C2 | 7/1989 | Germany . |
| 38 23 399 A1 | 8/1989 | Germany . |
| 41 21 177 A1 | 1/1992 | Germany . |

| | | |
|---|---|---|
| WO 93 09 600 A1 | 5/1993 | WIPO . |

OTHER PUBLICATIONS

McMurray, William; "Efficient Snubbers For Voltage–Source GTO Inverters"; IEEE Transactions On Power Electronics, vol. PE–2, No. 3, Jul. 1987, pp. 264–272.

Japanese Abstract of JP 1–81669 (A); E–787, Jul. 13, 1989; vol. 13; No. 307, English Translation.

Article entitled: "An Overview of Low–Loss Snubber Technology For Transistor Converters" by A. Ferraro, IEEE 1982, pp. 466–477.

Primary Examiner—Peter S. Wong
Assistant Examiner—Shawn Riley
Attorney, Agent, or Firm—Oblon, Spivak, McClelland, Maier, & Nuestadt, P.C.

[57] ABSTRACT

A converter circuit arrangement in which the gate turn-off thyristors are driven hard, i.e., the GTO is driven with a gate current configured in such a way that the turn-off gain IS/IGpeak is distinctly less than 3 so as to result in an anode voltage rise of at least 1 kV/μs. The snubber circuit of such driven thyristors may be designed to include only a small number of elements. The voltage rise limiter includes at least one capacitor connected in parallel with one of the reverse-connected parallel diodes. The current rise limiter includes a parallel circuit having an inductor and a current limiting diode.

18 Claims, 2 Drawing Sheets

CONVERTER CIRCUIT ARRANGEMENT WITH MINIMAL SNUBBER

BACKGROUND OF THE INVENTION

1. Field of the Invention

The invention is concerned with the field of power electronics. It is based on a converter circuit arrangement.

2. Discussion of Background

Such circuit arrangements are described, for example, in the article "Efficient Snubbers for Voltage-Source GTO Inverters" by W. McMurray, IEEE Transactions on Power Electronics, Vol. PE-2, No. 3, July 1987. The article describes converter circuit arrangements having at least two series-connected GTOs, which are connected to a DC voltage source and form a load terminal with the common node of the series circuit. Additionally provided in parallel with the GTOs are so-called reverse-connected parallel diodes, which take over the flow of current following commutation. In order to protect the GTOs against excessively high current and voltage slopes during switching, it is necessary to provide a snubber. According to the prior art as explained in the abovementioned article, said snubber comprises a comparatively complex network of inductors, capacitors, resistors and diodes. Further snubber variants are disclosed by the article "An Overview of Low-Loss Snubber Technology for Transistor Converters" by A. Ferraro, IEEE 1982, pages 466–477.

The European Patent Applications EP-A1-0 489 945 and WO-93/09600 of the same inventor describe the so-called "hard driving" of a GTO and specify circuit arrangements for corresponding drive units. With regard to these two European Patent Applications, the term "hard driving" is understood to mean the driving of the GTO with a gate current which is configured in such a way that the turn-off gain IA/IGpeak is distinctly less than 3 and so as to result in an anode voltage rise of at least 1 kV/µs. This hard driving is significant within the context of the present invention and the contents of the European Patent Applications cited above are therefore to be expressly included at this point.

SUMMARY OF TIME INVENTION

Accordingly, one object of the invention is to provide a novel converter circuit arrangement having GTOs, which manages with as few snubber elements as possible and therefore takes up as little space as possible and is inexpensive to produce.

The core of the invention, therefore, is that the GTOs are driven hard and that the voltage rise limiting means comprise merely a capacitor which is connected in parallel with one of the reverse-connected parallel diodes. It is not important here which reverse-connected parallel diode the capacitor is connected in parallel with or even whether a capacitor is provided for each reverse-connected parallel diode.

This type of driving, together with the voltage rise limiting means according to the invention, permits a simplification of the current rise limiting means, for example for the known McMurray and Undeland snubbers. In particular, it is possible to dispense with a number of resistors and diodes, and the values of the remaining capacitors and inductors can be drastically reduced.

Further exemplary embodiments emerge from the corresponding dependent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Figure 1:
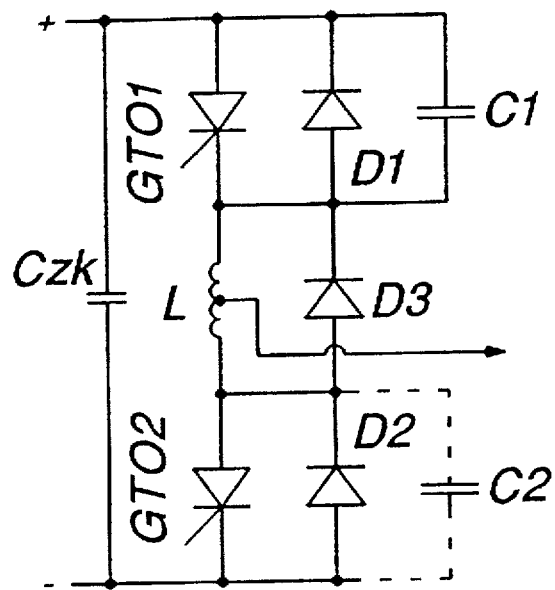
FIG. 1 shows the circuit diagram of a first exemplary embodiment of the invention.

The reference symbols used in the drawings and their meaning are summarized in the list of designations.

DESCRIPTION OF THE PREFERRED EMBODIMENTS

Referring now to the drawings, wherein like reference numerals designate identical or corresponding parts throughout the several views, FIG. 1 shows an equivalent circuit diagram of a first embodiment of the invention. According to the invention, the GTOs of a circuit arrangement are driven "hard". Dynamic avalanche effects occurring during the turn-off operation occur as the new loading limit. The available silicon area of the semiconductor chip can be utilized homogeneously. Due to the hard driving, the turn-on operation can be accelerated in such a way that the destruction limit of the GTO can be increased from 500 A/µs at the present time to more than 3000 A/µs. FIG. 1 illustrates a branch having a first gate turn-off thyristor GTO1 and having a second GTO2 as well as diodes D1 and D2 which are reverse-connected in parallel therewith. The branch is connected to the positive and negative terminals of a DC voltage source—represented by the intermediate circuit capacitor Czk. The GTOs are now driven alternately in a known manner—see the publications cited in the introduction—by a drive unit (not illustrated) in such a way that an AC voltage is produced at the load terminal. Of course, it is possible to provide a plurality of identically constructed branches, with which a polyphase AC voltage system can be constructed. For the sake of clarity, however, only one branch is illustrated in each of the Figures.

According to the embodiment illustrated in FIG. 1, the voltage rise limiting means comprise, per branch, merely a capacitor C1 or C2, which is connected in parallel with one of the reverse-connected parallel diodes D1 and D2 which are reverse-connected in parallel with the corresponding GTO. The capacitor C1 or C2 can be assigned either to the first (GTO1) or to the second (GTO2) thyristor. However, it is also possible to provide a capacitor for each thyristor, that is to say in parallel with each reverse-connected parallel diode.

Compared with the known McMurray snubber, therefore, the so-called snubber diodes, connected between the reverse-connected parallel diode and the capacitors, and the freewheeling resistor are omitted. As a result, the current rise limiting means now comprise merely an inductor L between the two GTOs of a branch and a diode D3 connected in parallel therewith. The load terminal of the branch can be formed either by a center tap of the coil of the inductor L or by the common node of two individual coils connected in series.

It lies within the scope of the invention to provide, per branch, either only one capacitor or else a capacitor for each thyristor. In the case of only one capacitor, its capacitance should correspond to the sum of the individual capacitors.

The mechanical structure is also simplified by the invention, because only 7 to 8 heat sinks are required instead of 10 of them per circuit. Even the values of the remaining snubber elements can be reduced. For an intermediate circuit voltage of 3 kV, only values of 0.5 μF are required for the capacitors C1 and C2 or 1 μF for only one capacitor, instead of 3 μF, and 2 μH for the inductor, instead of 10 μH. The following dimensioning prescription can be made: the ratio of a maximum gate turn-off current Imax, for which the circuit arrangement is designed, to the sum of the capacitance(s) of the capacitor(s) should be greater than or equal to 2 kV per μs. The following rule applies for calculating the inductance or inductances: the ratio of the intermediate circuit voltage to the sum of the inductances should be chosen to be greater than or equal to 1 kA per μs.

Figure 2:
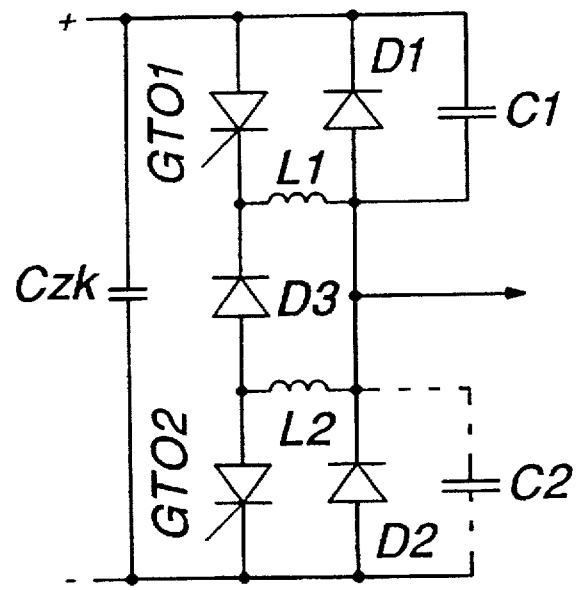
FIG. 2 shows the circuit diagram of a second exemplary embodiment of the invention.

FIG. 2 illustrates a variant of the circuit according to FIG. 1. In this case, the inductors L1 and L2 of the current rise limiting means are arranged between the reverse-connected parallel diodes D1 and D2, respectively, and the corresponding GTOs. The diode D3 is situated between the two GTOs, and the load terminal is formed by a connection of the two reverse-connected parallel diodes D1 and D2. In this circuit arrangement, it is possible to use GTOs whose anode/cathode voltage is limited to approximately 20 to 100 V in the event of reverse loading. This limits over-voltages across the turning-off GTO elements as a result of dissipation into the feeding circuit. Accordingly, it is possible to use conventional GTOs with anode shorts for this type of circuit.

Figure 3:
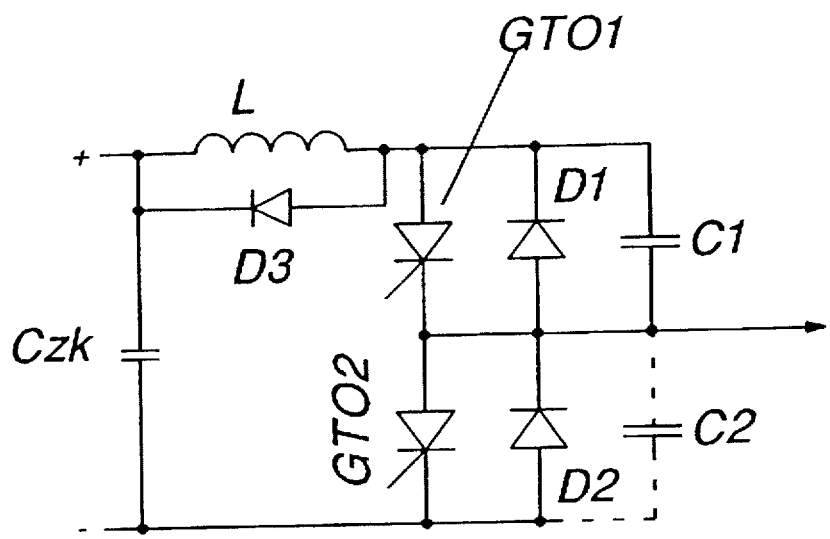
FIG. 3 shows the circuit diagram of a further exemplary embodiment of the invention.

FIG. 3 illustrates an embodiment of the invention which is derived from the so-called Undeland snubber. Once again, a respective reverse-connected parallel diode D1 and D2 is connected in parallel with the semiconductor switches GTO1 and GTO2 of a branch. The voltage rise limiting means comprise, per branch, at least one capacitor C1 or C2 which is connected directly in parallel with the respective reverse-connected parallel diode. Here, too, there is the option of providing just one capacitor or a capacitor for each thyristor. In contrast with the embodiments according to FIGS. 1 and 2, the current rise limiting means are not arranged between the GTOs, rather they face the positive or the negative pole of the DC voltage source. In the example according to FIG. 3, the means face the positive pole and comprise an inductor L with a diode D3 connected in parallel therewith.

Figure 4:
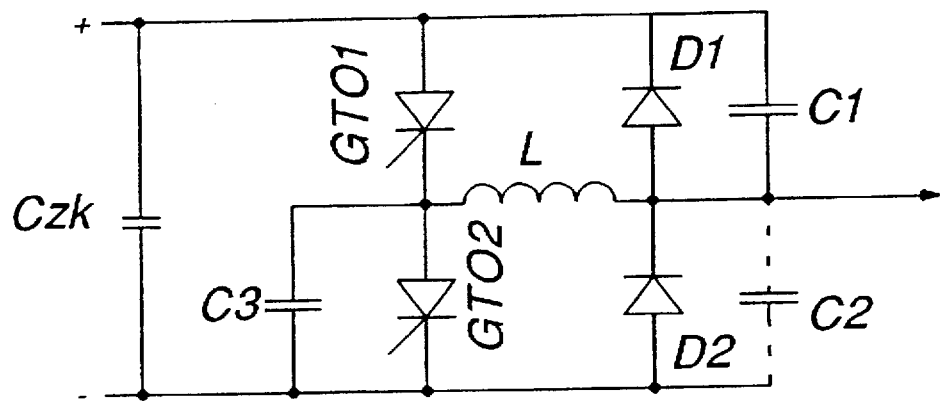
FIG. 4 shows the circuit diagram of an embodiment of the invention which manages with the least snubber circuitry.

FIG. 4 finally shows another embodiment, which manages with the least circuitry: when using GTOs having a reverse avalanche behavior (for example on account of anode shorts or an integrated avalanche region), it is possible to construct a circuit in which both the semiconductor switches GTO1 and GTO2 and the assigned reverse-connected parallel diodes D1 and D2 per branch are connected in series between the positive and negative pole of the DC voltage source. The current rise limiting is effected by an inductor L situated in the branch between the GTOs and the diodes. The voltage rise limiting means comprise at least one capacitor C2, which can optionally be connected in parallel with one of the reverse-connected parallel diodes D1 or D2. An arrangement having an additional capacitor C3 in parallel with one of the GTOs is particularly preferred. Here, too, it is possible to provide just one capacitor or a capacitor in parallel with each reverse-connected parallel diode.

In all of the circuit types specified, the reverse-connected parallel diode can be replaced by a series circuit of diodes having half the performance. An intermediate circuit voltage of 3 kV requires either a 4.5 kV reverse-connected parallel diode per semiconductor switch or two 2.5 kV diodes. The diode D3 preferably has a high forward voltage. This achieves a reduction in the freewheeling time and reduces the influence of the reverse recovery. As a result, the entire circuit arrangement becomes more resistant to failures caused by reverse recovery. Such a diode is obtained, for example, by irradiation with a higher electron dose than in the case of conventional diodes.

Overall, then, the invention provides the required preconditions for enabling circuit arrangements to be constructed with little snubber circuitry. At the same time, the number of branches can be chosen as desired. A series circuit of semiconductor switches may be provided as well, for the purpose of increasing the voltage strength.

Obviously, numerous modifications and variations of the present invention are possible in light of the above teachings. It is therefore to be understood that, within the scope of the appended claims, the invention may be practiced otherwise than as specifically described herein.

I claim:

1. A converter circuit arrangement having at least one branch having an even number of gate turn-off thyristors and having reverse-connected parallel diodes, which are reverse-connected in parallel with the thyristors, each branch being connected to a DC voltage source and a central, common node of each branch forming a load terminal, and also having current and voltage rise limiting means which protect the gate turn-off thyristors against excessively high current and voltage rise slopes, wherein the gate turn-off thyristors are driven hard, and wherein the voltage rise limiting means comprise, per branch, at least one capacitor, which is arranged in parallel with one of the reverse-connected parallel diodes of the respective thyristor wherein the current rise limiting means comprises a parallel circuit having only one inductor and only one current limiting diode, the parallel circuit being interconnected between the thyristors of each branch, and wherein a center tap of the inductor forms the load terminal.

2. The circuit arrangement as claimed in claim 1, wherein the capacitance of the capacitor or the sum of the capacitances of the capacitors of the voltage rise limiting means is chosen such that the ratio of a maximum gate turn-off current, for which the circuit arrangement is designed, to the capacitance or sum of the capacitances is greater than or equal to 2 kV per μs, and wherein the inductance of the current rise limiting means is chosen such that a ratio of an intermediate circuit voltage to the inductance is greater than or equal to 1 kA per μs.

3. The circuit arrangement as claimed in claims 2, wherein said capacitor is provided for more than just for one thyristor, said capacitor being provided in parallel with the corresponding reverse-connected parallel diodes.

4. The circuit arrangement as claimed in claim 3, wherein the capacitance of the capacitor or the sum of the capacitances of the capacitors of the voltage rise limiting means is chosen such that the ratio of a maximum gate turn-off current, for which the circuit arrangement is designed, to the capacitance or sum of the capacitances is greater than or equal to 2 kV per μs, and wherein the inductance of the current rise limiting means is chosen such that a ratio of an intermediate circuit voltage to the inductance is greater than or equal to 1 kA per μs.

5. The circuit arrangement as claimed in claim 1, wherein the thyristors are reverse conducting, preferably with an avalanche voltage of 20 to 100 V, and wherein the current rise limiting means comprise an inductor which is arranged between the thyristors and the reverse-connected parallel diodes of a branch.

6. The circuit arrangement as claimed in claim 5, wherein a further capacitor is provided in parallel with one half of the thyristors.

7. The circuit arrangement as claimed in claim 6, wherein the capacitance of the capacitor or the sum of the capacitances of the capacitors of the voltage rise limiting means is chosen such that the ratio of a maximum gate turn-off current, for which the circuit arrangement is designed, to the capacitance or sum of the capacitances is greater than or equal to 2 kV per µs, and wherein the inductance of the current rise limiting means is chosen such that a ratio of an intermediate circuit voltage to the inductance is greater than or equal to 1 kA per µs.

8. The circuit arrangement as claimed in claim 5, wherein said capacitor is provided for more than just for one thyristor, said capacitor being provided in parallel with the corresponding reverse-connected parallel diodes.

9. The circuit arrangement as claimed in claim 5, wherein the capacitance of the capacitor or the sum of the capacitances of the capacitors of the voltage rise limiting means is chosen such that the ratio of a maximum gate turn-off current, for which the circuit arrangement is designed, to the capacitance or sum of the capacitances is greater than or equal to 2 kV per µs, and wherein the inductance of the current rise limiting means is chosen such that a ratio of an intermediate circuit voltage to the inductance is greater than or equal to 1 kA per µs.

10. A converter circuit arrangement having at least one branch having an even number of gate turn-off thyristors and having reverse-connected parallel diodes, which are reverse-connected in parallel with the thyristors, each branch being connected to a DC voltage source and a central, common node of each branch forming a load terminal, and also having current and voltage rise limiting means which protect the gate turn-off thyristors against excessively high current and voltage rise slopes, wherein the gate turn-off thyristors are driven hard, and wherein the voltage rise limiting means comprise, per branch, at least one capacitor, which is arranged in parallel with one of the reverse-connected parallel diodes of the respective thyristor wherein the current rise limiting means comprises a parallel circuit including two separate series-connection coils with the load terminal being arranged in the center of the two coils.

11. The circuit arrangement as claimed in claim 10, wherein said capacitor is provided for more than just for one thyristor, said capacitor being provided in parallel with the corresponding reverse-connected parallel diodes.

12. The circuit arrangement as claimed in claim 10, wherein the capacitance of the capacitor or the sum of the capacitances of the capacitors of the voltage rise limiting means is chosen such that the ratio of a maximum gate turn-off current, for which the circuit arrangement is designed, to the capacitance or sum of the capacitances is greater than or equal to 2 kV per µs, and wherein the inductance of the current rise limiting means is chosen such that a ratio of an intermediate circuit voltage to the inductance is greater than or equal to 1 kA per µs.

13. A converter circuit arrangement having at least one branch having an even number of gate turn-off thyristors and having reverse-connected parallel diodes, which are reverse-connected in parallel with the thyristors, each branch being connected to a DC voltage source and a central, common node of each branch forming a load terminal, and also having current and voltage rise limiting means which protect the gate turn-off thyristors against excessively high current and voltage rise slopes, wherein the gate turn-off thyristors are driven hard, and wherein the voltage rise limiting means comprise, per branch, at least one capacitor, which is arranged in parallel with one of the reverse-connected parallel diodes of the respective thyristor wherein the current rise limiting means is arranged between one of the poles of the DC voltage source and each branch and comprises a parallel circuit of only one inductor and only one current limiting diode.

14. The circuit arrangement as claimed in claim 13, wherein said capacitor is provided for more than just for one thyristor, said capacitor being provided in parallel with the corresponding reverse-connected parallel diodes.

15. The circuit arrangement as claimed in claim 13, wherein the capacitance of the capacitor or the sum of the capacitances of the capacitors of the voltage rise limiting means is chosen such that the ratio of a maximum gate turn-off current, for which the circuit arrangement is designed, to the capacitance or sum of the capacitances is greater than or equal to 2 kV per µs, and wherein the inductance of the current rise limiting means is chosen such that a ratio of an intermediate circuit voltage to the inductance is greater than or equal to 1 kA per µs.

16. A converter circuit arrangement having at least one branch having an even number of gate turn-off thyristors and having reverse-connected parallel diodes, which are reverse-connected in parallel with the thyristors, each branch being connected to a DC voltage source and a central, common node of each branch forming a load terminal, and also having current and voltage rise limiting means which protect the gate turn-off thyristors against excessively high current and voltage rise slopes, wherein the gate turn-off thyristors are driven hard, and wherein the voltage rise limiting means comprise, per branch, at least one capacitor, which is arranged in parallel with one of the reverse-connected parallel diodes of the respective thyristor wherein the current rise limiting means comprises two inductors which are each arranged between the thyristors and the associated reverse-connected parallel diodes of the branch, and a diode which is arranged between the thyristors of the branch, wherein the load terminal is formed by a connection of the reverse-connected parallel diodes and the inductors.

17. The circuit arrangement as claimed in claim 16, wherein said capacitor is provided for more than just for one thyristor; said capacitor being provided in parallel with the corresponding reverse-connected parallel diodes.

18. The circuit arrangement as claimed in claim 16, wherein the capacitance of the capacitor or the sum of the capacitances of the capacitors of the voltage rise limiting means is chosen such that the ratio of a maximum gate turn-off current, for which the circuit arrangement is designed, to the capacitance or sum of the capacitances is greater than or equal to 2 kV per µs, and wherein the inductance of the current rise limiting means is chosen such that a ratio of an intermediate circuit voltage to the inductance is greater than or equal to 1 kA per µs.

* * * * *